US012069036B2

(12) United States Patent
Pollack et al.

(10) Patent No.: US 12,069,036 B2
(45) Date of Patent: Aug. 20, 2024

(54) ENCRYPTED SHARED STATE FOR ELECTRONIC CONFERENCING

(71) Applicant: Apple Inc., Cupertino, CA (US)

(72) Inventors: Daniel B. Pollack, Cupertino, CA (US); Jingyao Zhang, Sunnyvale, CA (US); Jose A. Lozano Hinojosa, Santa Clara, CA (US); Emad Omara, Cupertino, CA (US); Yilmaz Can Cecen, Cupertino, CA (US); Angus N. Burton, San Mateo, CA (US); Blerim Cici, San Jose, CA (US)

(73) Assignee: Apple Inc., Cupertino, CA (US)

( * ) Notice: Subject to any disclaimer, the term of this patent is extended or adjusted under 35 U.S.C. 154(b) by 318 days.

(21) Appl. No.: 17/707,926

(22) Filed: Mar. 29, 2022

(65) Prior Publication Data

US 2022/0368685 A1    Nov. 17, 2022

Related U.S. Application Data

(60) Provisional application No. 63/189,152, filed on May 15, 2021.

(51) Int. Cl.
*H04L 29/06* (2006.01)
*H04L 9/08* (2006.01)
*H04L 9/16* (2006.01)
*H04L 9/40* (2022.01)

(52) U.S. Cl.
CPC .......... *H04L 63/065* (2013.01); *H04L 9/0861* (2013.01); *H04L 9/16* (2013.01); *H04L 63/0428* (2013.01)

(58) Field of Classification Search
CPC .................................................... H04L 63/065
See application file for complete search history.

(56) References Cited

U.S. PATENT DOCUMENTS

| | | | | |
|---|---|---|---|---|
| 11,006,077 | B1 * | 5/2021 | Truong | H04N 7/15 |
| 2011/0072366 | A1 * | 3/2011 | Spencer | H04N 7/157 |
| | | | | 715/757 |
| 2012/0084670 | A1 * | 4/2012 | Momchilov | H04W 4/023 |
| | | | | 715/753 |
| 2017/0180486 | A1 * | 6/2017 | Mehta | H04L 43/0852 |

OTHER PUBLICATIONS

Ajaay, "How to Watch Movies on FaceTime: Step-by-step Guide," Oct. 28, 2021, retrieved from https://nerdschalk.com/how-to-watch-movies-on-facetime-step-by-step-guide/.

* cited by examiner

*Primary Examiner* — Bradley W Holder
(74) *Attorney, Agent, or Firm* — BAKERHOSTETLER

(57) ABSTRACT

Aspects of the subject technology provide for shared experience sessions within a group communications session such as a video call. The shared experience session may be, as one example, a co-watching session in which the participants in the call watch a video together while in the call. Encrypted shared state data may be exchanged between the participant devices, with which the participant devices can provide synchronized and coordinated output of shared experience data for the shared experience session of the group communications session.

20 Claims, 11 Drawing Sheets

ENCRYPTED SHARED STATE FOR ELECTRONIC CONFERENCING

CROSS REFERENCE TO RELATED APPLICATIONS

This application claims the benefit of priority to U.S. Provisional Patent Application No. 63/189,152, entitled "Encrypted Shared State for Electronic Conferencing," filed on May 15, 2021, the disclosure of which is hereby incorporated herein in its entirety.

TECHNICAL FIELD

The present description relates generally to electronic conferencing, including, for example, encrypting shared states for electronic conferencing.

BACKGROUND

Video conferencing allows people in remote locations to each view an incoming video stream of the other in real time.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
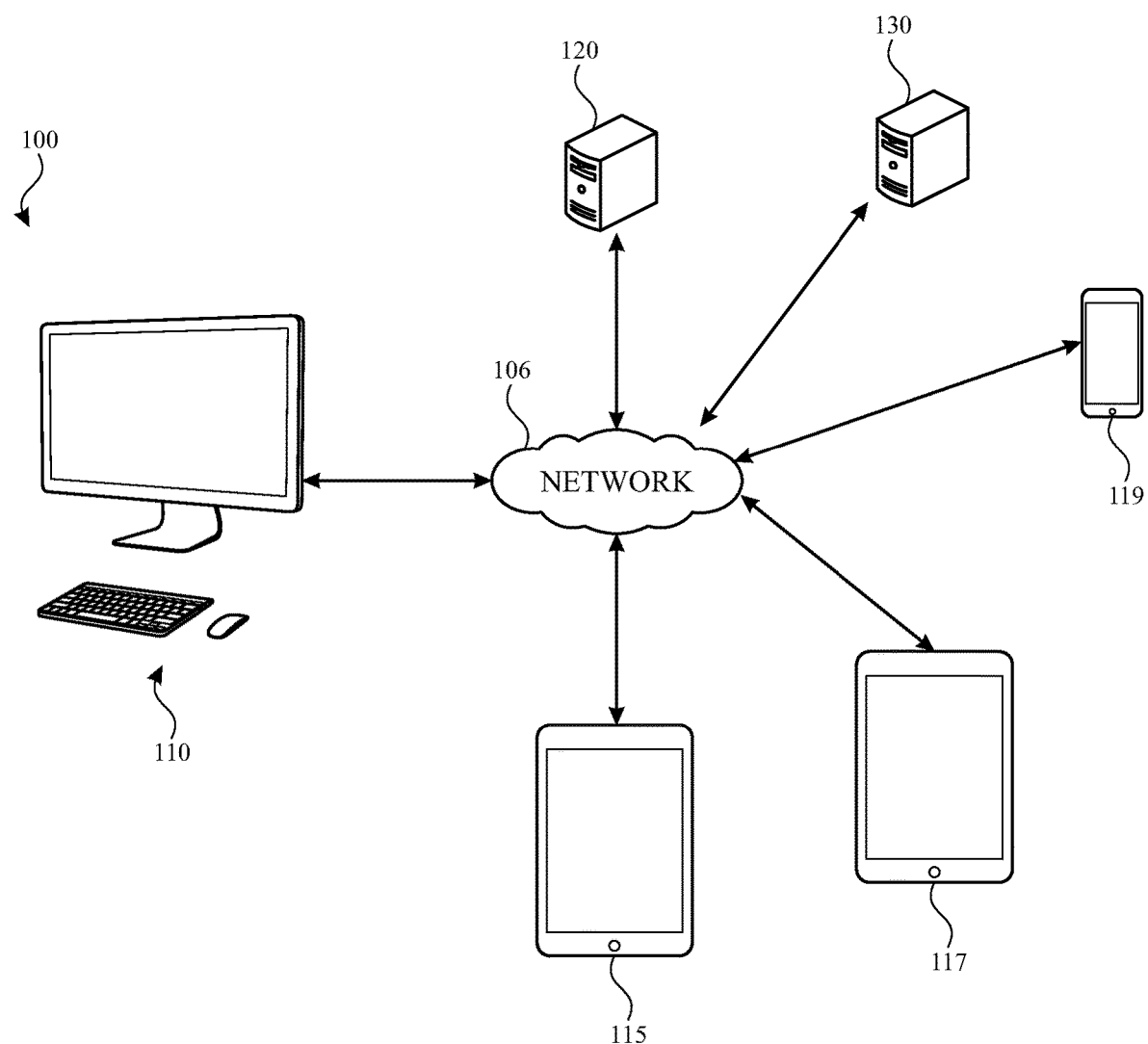
FIG. 1 illustrates an example network environment for conferencing in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Conferencing modules (e.g., conferencing applications) can be installed on electronic devices to allow users of the electronic devices to exchange and view audio and/or video feeds of each other in real time, such as in a group communications session. In some scenarios, it can be desirable to provide a shared experience, within the group communications session, for the participants in the group communications session. For example, the participants in a group communications session may want to watch a video together, listen to a song together, play a shared playlist during the group communications session, collaborate on a document, perform a group activity, or otherwise engage in an experience that is enhanced by sharing data (shared state data) among others participating in the same experience. Shared state data can include any suitable data that is relevant to the shared experience. Non-limiting examples of shared state data include; media content; media content metadata; media content time codes; media content access information; media content processing instructions; document annotation data; document metadata; user input data; participant pointer data; participant state data; telemetry data; sensor data; location data; a time stamp that indicates where a playhead is for a video or audio stream, in a timeline; a playlist of songs in an order to be played; or any other suitable type of state data that can be shared to enhance a shared experience.

In some systems, an application running at a participant device of one of the participants in a shared experience session within a group communications session can provide shared state data to the group communications session.

In some scenarios, it is helpful to synchronize the outputting (or processing) of data related to the shared experience (e.g., the shared state data, data related to the shared state data, etc.) at one or more of the participant devices. In some variations, the shared state data can be used to synchronize processing of shared experience data at one or more of the participant devices. For example, a participant device that processes shared experience data (e.g., video content, music content, or other application content) can use shared state data received from one or more other participant devices to process the shared experience data. In an example, shared state data provided by a first participant device may indicate the state of the output of the shared experience data at the first participant device; a second participant device that receives the shared state data can synchronize the output of the shared experience data at that second participant device with the output of the shared experience data at the first participant device (e.g., so that two participants in a conferencing session that are watching a movie together see the same part of the movie at the same time on their respective devices and can thus react together to the experience of watching the movie).

Aspects of the subject technology disclosed herein can be helpful, for example, in providing shared state data that is accessible only to trusted participants in a shared experience session, and that can allow participants to join a shared experience session within a conferencing session at the beginning of the shared experience session or during an ongoing shared experience session.

In one or more implementations, shared state data for a group communication session (e.g., a conferencing session such as an audio conferencing session or a video conferencing session), can be encrypted with a key that is different from a key that is used to encrypt user communications for the group communication session. The key for the shared state data may be derived using information that corresponds to the shared experience (e.g., a topic of the shared experience). Aspects of the subject technology also provide a mechanism by which a participant device that joins a shared experience session after the shared experience excess session has already begun can obtain prior shared state data that was exchanged between other participant devices before the new participant device joined the shared experience session.

FIG. 1 illustrates an example network environment 100 in which shared state data for a shared experience session within a group communications session may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, an electronic device 117, an electronic device 119, and one or more servers such as a conferencing server 120, and a server 130. The network 106 may communicatively (directly or indirectly) couple the electronic device 110, the electronic device 115, the electronic device 117, the electronic device 119, the conferencing server 120, and/or a server 130. In one or more implementations, the network 106 may be an interconnected network of devices that may include, or may be communicatively coupled to, the Internet. For explanatory purposes, the network environment 100 is illustrated in FIG. 1 as including the electronic device 110, the electronic device 115, the electronic device 117, the electronic device 119, the conferencing server 120, and the server 130; however, the network environment 100 may include any number of electronic devices and/or any number of servers communicatively coupled to each other directly or via network 106.

The electronic device 110 may be, for example, a desktop computer, a portable computing device such as a laptop computer, a smartphone, a peripheral device (e.g., a digital camera, headphones), a tablet device, standalone videoconferencing hardware, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In one or more implementations, the electronic device 110 may include a conferencing module and one or more applications. In FIG. 1, by way of example, the electronic device 110 is depicted as a desktop computer. The electronic device 110 may be, and/or may include all or part of, the electronic system discussed below with respect to FIG. 11. In one or more implementations, the electronic device 110 may include a camera and a microphone and may provide the conferencing module for obtaining and/or exchanging user communications data such as audio streams and/or video streams over the network 106, such as with a corresponding conferencing module that is installed and accessible at, for example, electronic device 115, electronic device 117, and/or electronic device 119.

The electronic device 115 may be, for example, a portable computing device such as a laptop computer, a smartphone, a peripheral device (e.g., a digital camera, headphones), a tablet device, a wearable device such as a watch, a band, and the like, any other appropriate device that includes, for example, one or more wireless interfaces, such as WLAN radios, cellular radios, Bluetooth radios, Zigbee radios, near field communication (NFC) radios, and/or other wireless radios. In one or more implementations, the electronic device 115 may include a conferencing module and one or more applications. In FIG. 1, by way of example, the electronic device 115 is depicted as a tablet computer. The electronic device 115 may be, and/or may include all or part of, the electronic system discussed below with respect to FIG. 11. In one or more implementations, the electronic device 115 may include a camera and a microphone and may provide the conferencing module for obtaining and/or exchanging user communications data such as audio streams and/or video streams over the network 106, such as with a corresponding conferencing module that is installed and accessible at, for example, electronic device 110, electronic device 117, and/or electronic device 119.

The electronic device 117 may be, for example, a portable computing device such as a laptop computer, a smartphone, a peripheral device (e.g., a digital camera, headphones), a tablet device, a wearable device such as a watch, a band, and the like, any other appropriate device that includes, for example, one or more wireless interfaces, such as WLAN radios, cellular radios, Bluetooth radios, Zigbee radios, near field communication (NFC) radios, and/or other wireless radios. In one or more implementations, the electronic device 117 may include a conferencing module and one or more applications. In FIG. 1, by way of example, the electronic device 117 is depicted as a tablet computer. The electronic device 117 may be, and/or may include all or part of, the electronic system discussed below with respect to FIG. 11. In one or more implementations, the electronic device 117 may include a camera and a microphone and may provide the conferencing module for obtaining and/or exchanging user communications data such as audio streams and/or video streams over the network 106, such as with a corresponding conferencing module that is installed and accessible at, for example, electronic device 115, electronic device 110, and/or electronic device 119.

The electronic device 119 may be, for example, a portable computing device such as a laptop computer, a smartphone, a peripheral device (e.g., a digital camera, headphones), a tablet device, a wearable device such as a watch, a band, and the like, any other appropriate device that includes, for example, one or more wireless interfaces, such as WLAN radios, cellular radios, Bluetooth radios, Zigbee radios, near field communication (NFC) radios, and/or other wireless radios. In one or more implementations, the electronic device 119 may include a conferencing module and one or more applications. In FIG. 1, by way of example, the electronic device 119 is depicted as a smartphone. The electronic device 119 may be, and/or may include all or part of, the electronic system discussed below with respect to FIG. 11. In one or more implementations, the electronic device 119 may include a camera and a microphone and may provide the conferencing module for obtaining and/or exchanging user communications data such as audio streams and/or video streams over the network 106, such as with a corresponding conferencing module that is installed and accessible at, for example, electronic device 115, electronic device 117, and/or electronic device 110.

In one or more implementations, one or more servers such as the conferencing server 120 may perform operations for managing secure exchange of user communications data and/or shared state data between various electronic devices such as the electronic device 110, the electronic device 115, the electronic device 117, and/or the electronic device 119, such as during a group communications session (e.g., an audio conferencing session or a video conferencing session). In some variations, the conferencing server 120 is a relay server (e.g., a Quick Relay Server). In some variations, the conferencing server 120 includes one or more app-specific modules (e.g., plugins) that perform operations for a respective application. In some variations, the app-specific modules include PubSub modules. In some variations, the conferencing server 120 includes a pub-sub module for each shared experience session. In some variations, the conferencing server 120 includes at least one pub-sub module that manages a plurality of shared experience sessions.

In some implementations, when a new shared experience session is created for an associated application, if the conferencing server 120 includes a pub-sub module for the application, the shared experience session is managed by the existing pub-sub module. However, if the conferencing server 120 does not include a pub-sub module for the application, then a new pub-sub module for the application is instantiated, and the instantiated pub-sub module is used to manage the shared experience session.

In some implementations, at least one pub-sub module of the conferencing server functions to: receive subscriptions to shared state data published to the pub-sub module by participant devices, receive shared state data published by participant devices, and provide the received shared state data to subscribers.

In one or more implementations, the conferencing server 120 may store account information associated with the electronic device 110, the electronic device 115, the electronic device 117, the electronic device 119, and/or users of those devices. In one or more implementations, one or more servers such as the server 130 may provide content (e.g., media content, application content, or any other suitable data) that is to be processed at a participant device (e.g., the electronic device 110, the electronic device 115, the electronic device 117, the electronic device 119) by an application (e.g., 202 shown in FIG. 2) of the participant device.

Figure 2:
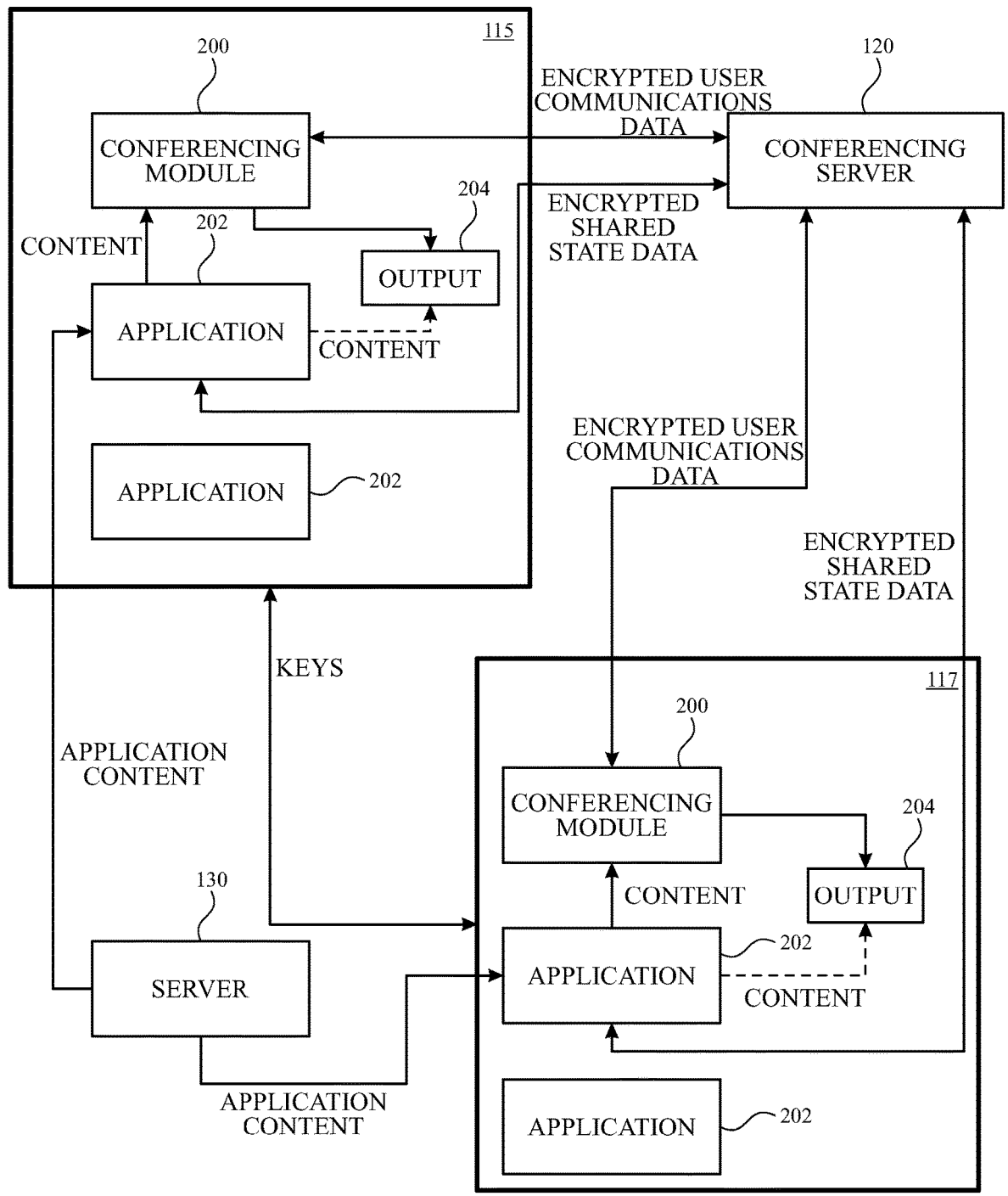
FIG. 2 illustrates a schematic view of first and second electronic devices participating in a shared experience session during a conferencing session in accordance with one or more implementations.

FIG. 2 schematically illustrates various hardware and software features of two participant devices during a group communications session (also referred to herein as a conferencing session) that includes a shared experience session. In the example of FIG. 2, the electronic device 115 and the electronic device 117 are participant devices in a shared experience session within a group communications session. As shown in FIG. 2, the electronic device 115 and the electronic device 119 may each include a conferencing module 200, and one or more applications 202. In some variations, an application 202 running on a participant device processes or presents received shared state data (e.g., received form the conferencing server 120). In some variations, an application 202 running on a participant device provides shared state data to a shared experience session (e.g., a shared experience session managed by the conferencing server 120).

In some variations, an application 202 running on a participant device presents content at the participant device, and the presentation is optionally performed in accordance with received shared state data (e.g., received form the conferencing server 120). For example, applications 202 may include a video content application that obtains video content (e.g., movies, television show, etc.) from a media server (e.g., server 130) (e.g., a server of a media service to which users can subscribe and/or otherwise purchase and/or stream video content) for output at the electronic device at which the application is running, an audio content application (e.g., a music player application) that obtains audio content (e.g., music, podcasts, etc.) from a media server (e.g., 130) (e.g., a server of a media service to which users can subscribe and/or otherwise purchase and/or stream audio content) for output at the electronic device at which the application is running, a messaging application that receives messaging content (e.g., chat messages, text messages, images, emojis, etc.) from a user of the device and/or messaging content e.g., chat messages, text messages, images, emojis, etc.) from another participant device, or any other application that can generate, process, and/or provide content for output at the electronic device at which the application is running. In some variations, the content is processed in accordance with received shared state data.

In one or more implementations, the application(s) 202 and/or one or more other applications at electronic device 115 or electronic device 117 may be added (e.g., by a user of that device) as a participant in a group communications session with the other of the electronic device 115 or electronic device 117. An application (e.g., an application 202) that has been added to the group communications session can add shared state data (e.g., media content) to the group communication session. For example, as shown in FIG. 2, a conferencing module 200 running at an electronic device can provide user communications content to one or more output components 204 (e.g., display and/or a speaker) at the electronic device at which the conferencing module 200 is running. The user communications content may include audio and/or video content received by input components (e.g., a microphone and/or a camera) at that electronic device, and/or audio and/or video content received from another participant device via a conferencing server 120. In this way, users of the participant devices in the group communications session can hear and/or see each other in real time via the participant devices.

As shown in FIG. 2, an application 202 can obtain content from the server 130, and provide the obtained content to the output components 204 at the device at which the application 202 is running, so that the output components 204 can present the received content at the device.

As shown in FIG. 2, the application 202 at the electronic device 115 can exchange shared state data with the application 202 at the electronic device 117. For example, the application 202 at the electronic device 115 can publish shared state data (e.g., to a pub-sub module associated with the shared experience session managed by the conferencing server 120) generated by (or accessed by) the electronic device 115, and the electronic device 117 can subscribe to and obtain the shared state data published by the electronic device 115 (e.g., by interacting with the pub-sub module associated with the shared experience session). In some variations, the electronic device 117 presents the obtained shared state data. In some variations, the electronic device 117 uses the obtained shared state data to control presentation of content provided by the application 202 at the electronic device 117.

In one or more implementations, the application 202 at the electronic device 117 can also publish shared state data (e.g., by interacting with the pub-sub module associated with the shared experience session) generated by (or accessed by) the electronic device 117, and the electronic device 115 can subscribe to and obtain the shared state data published by the electronic device 117. In the example of FIG. 2, the applications 202 provide the shared state data directly to the conferencing server 120 for delivery to the application 202 at the other participant devices. In some implementations, the applications provide the shared state data to a respective pub-sub module included in (or associated with) the conferencing server 120. However, in other implementations, the applications 202 can provide the shared state data to the conferencing module 200 for publication to the conferencing server 120 for delivery to the application 202 at the other participant devices.

In one or more implementations, the application 202 can provide the shared state data for the group communications session, using already established communication paths of the group communications session, or using separate communication paths. For example, the electronic device 115 may provide the shared state data for a shared experience session by sending the shared state data to the same endpoints at the conferencing server 120 that are used for the user communications data of the group communication session (e.g., including topic headers for the shared experience session), or the shared state data may be sent to different endpoints (e.g., a different IP address, a different socket, a different publication channel, etc.) from the user communications data for the group communication session.

As indicated in FIG. 2, the user communications data that is exchanged between the electronic device 115 and the electronic device 117 for the group communications session can be encrypted at the respective devices and relayed to the other devices by the conferencing server 120. FIG. 2 also indicates that the shared state data that is exchanged between the electronic device 115 and the electronic device 117 for the shared experience session within the group communications session can also be encrypted at the respective devices and relayed to the other devices by the conferencing server 120. As indicated in FIG. 2, one or more keys (e.g., encryption keys) and/or information for generating the keys for encrypting/decrypting the user communications data and/or the shared state data may be exchanged by the electronic device 115 and the electronic device 117 separately from the conferencing server 120 (e.g., directly or via one or more other servers such as a messaging server or a push server). In this way, each of the electronic devices in a group communications session can have and maintain the keys for encrypting and decrypting the user communications data and the shared state data, without exposing the keys to the conferencing server. In this way, the conferencing server (e.g., relay server) that relays the data between the devices can be prevented from accessing the user communications data or the shared state data.

In the example of FIG. 2, the depicted group communications session includes two participant devices (e.g., electronic device 115 and electronic device 117). However, it is appreciated that one, two, three, or more than three additional participant devices may participate in, join and/or leave the group communications session at any of various times. In the example of FIG. 2, a single shared experience session provided by a single application 202 is depicted. However it is also appreciated that multiple applications can be added as participants in the group communications session to provide shared state data for multiple respective shared experience sessions within a single group communications session. For example, a white board application and a music player application can provide a shared white board experience and shared listening experience within the same video call, so that the participants in the video call can cooperatively sketch, write and/or draw on the shared white board while listening to music together. Each shared experience session may have a corresponding topic (e.g., an application-specific topic that corresponds to the application that is providing the shared experience data and the shared state data for that shared experience session). In some implementations, shared state data for each shared experience session may be managed by a different pub-sub module of the conferencing server 120. However, in other implementations, shared state data for two or more shared experience sessions may be managed by a same pub-sub module of the conferencing server 120.

In various implementations, shared experience sessions may have different interaction characteristics for users than the user communications data that is exchanged within the group communications session. For example, while a user may not expect to be able to reverse another user's real time video feed during a video conference, participants in a shared experience session in which the participants are watching movie together are likely to expect to be able to pause, rewind, fast forward, restart, or otherwise interact with the content related to the shared experience session (e.g., the media content) in ways that are not expected for user communications content, and in ways that are expected to be coordinated among the participant devices. As another non-limiting example, in a shared experience session in which participants are exchanging messages (e.g., chat messages, text messages, images, emojis, etc.) with each other during the group communications session, the participants and/or a new participant may expect to be able to see past messages that have been exchanged during the messaging session within the group communications session. In order, for example, to provide these capabilities, aspects of the encryption, decryption, and/or exchange of the shared state data may be handled differently from the encryption, decryption, and/or exchange of the user communications data, as described herein in further detail in connection with, for example, FIGS. 4-10.

For example, as described herein in further detail in connection with, for example, FIGS. 4-10, the user communications data may be encrypted with a first encryption key and the shared state data may be encrypted with a second encryption key that is different from the first encryption key. For example, the second encryption key may be derived using information, such as a topic, for a shared experience session. The second encryption key may be updated (e.g., rolled and/or ratcheted) at different times and/or responsive to different triggers than the first encryption key, in one or more implementations. Rolling a key may include, for example, each device in a group communications session and/or a shared experience session generating a new key and providing the new key to the other participant device, or each device updating an existing key using an agreed upon update protocol. In scenarios in which a group communications session includes multiple shared experience sessions, the shared state data for each shared experience session may be encrypted using a corresponding key that has been derived using the topic for that shared experience session. In this way, an application providing data for one shared experience session in a group communications session may be prevented from decrypting or accessing data provided by another application that is also providing data for another shared experience session in the group communications session In one or more implementations, during a group communications session (e.g., an audio call or a video call), the electronic device 115 exchanges user communications data that is encrypted using a first encryption key with the electronic device 117. The electronic device 115 may, via an application (e.g., application 202 or another application) running on the electronic device 115, exchange shared state data with the electronic device 117 for a shared experience session of the group communications session.

For example, the shared state data may relate to media streaming data generated or accessed by an application (e.g., application 202 or another application) running at the electronic device 115. In some examples, the shared state data includes state information indicating a state of a streaming of the related media streaming data at the electronic device 117.

The shared state data may be encrypted with a second encryption key that is different from the first encryption key and derived using information (e.g., a topic, an application identifier, etc.) corresponding to the shared experience session. In one or more implementations, the electronic device 115 may derive the second encryption key for encryption of the shared state data. For example, the electronic device 115 may derive the second encryption key from a public key (e.g., a public key generated at the electronic device 115 for the shared experience session or received from another participant device in the group communication session) or the first encryption key, and from information associated with the shared experience session. For example, the information associated with the shared experience session may include a topic corresponding to the shared experience session, an identifier of the topic, or an identifier of an application providing the shared state data. The second encryption key may be derived from a public key that is same for all participants in the group communications session (e.g., an initiator device key that is provided to all other participant devices). In one or more implementations, for every application-specific topic, a separate encryption key may be derived from the public key and an identifier associated with the topic. For example, the second encryption keys for multiple shared experience sessions may each be an application-specific unique key generated for a corresponding one of the shared experience sessions, for preventing one application from gaining access to shared experience data related to other applications.

In one or more implementations, the public key and the topic are provided as an input to a key derivation function at the electronic device 115 to generate the second encryption key. In one or more implementations, a topic for a shared experience session may represent an activity (e.g., co-watching or co-listening), or an application providing the data for the shared experience session (e.g., an application name or identifier). In one or more implementations, each participant device may have a root key that is exchanged with the other participant devices, as indicated in FIG. 2. Each participant device may derive the second encryption key for a shared experience session from a topic for the shared experience session and the root key of the initiating device for the shared experience session. In one or more implementations, the topic for a shared experience session may be exchanged between the participant devices in addition to the keys for the user communications data and the shared state data. In one or more implementations, topics and/or keys that are exchanged between the participant devices may also be encrypted before being exchanged.

In the example of FIG. 2, the electronic device 115, the electronic device 117 or another participant device may have been the initiator of the group communications session and/or shared experience session within the group communications session. In one or more implementations, initiating the shared experience session may include activating the application that provides the shared state data for the shared experience session. In some variations, the application generates the provided shared state data. In other variations, the application accesses the provided shared state data.

In one or more implementations, the first encryption key for encrypting the user communications data and the second encryption key for encrypting the shared state data may be updated (e.g., rolled) according to different schedules and/or criteria. For example, the first encryption key for encrypting the user communications data may be updated by all participant devices periodically and upon detection of a change in membership for the group communications session (e.g., when a new participant is added to group communications session or when a participant is removed from the group communications session). In this way, new participants can only decrypt user communications data generated after they have been admitted to the group communications session, and participants that have left the group communications session can be prevented from decrypting user communications data generated after they have left the group communications session.

However, it may be desirable to allow backwards decryption of shared state data for new participants in a shared experience session within a group communications session, in one or more implementations. In one or more implementations, the second encryption key for encryption/decryption of shared state data may be updated (e.g., rolled) when membership for the group communications session changes but not on a periodic schedule. Updating the first encryption key or the second encryption key may include, at each participant device, creating a new encryption key for that participant device, encrypting the new encryption key with a previously exchanged pre-key, and providing the new encryption key to the other participant devices. As described in further detail hereinafter (e.g., in connection with FIG. 6), when a new participant device joins an ongoing shared experience session, the new participant device may obtain prior shared state data for the shared experience session from an existing participant device in the shared experience session.

Figure 3:
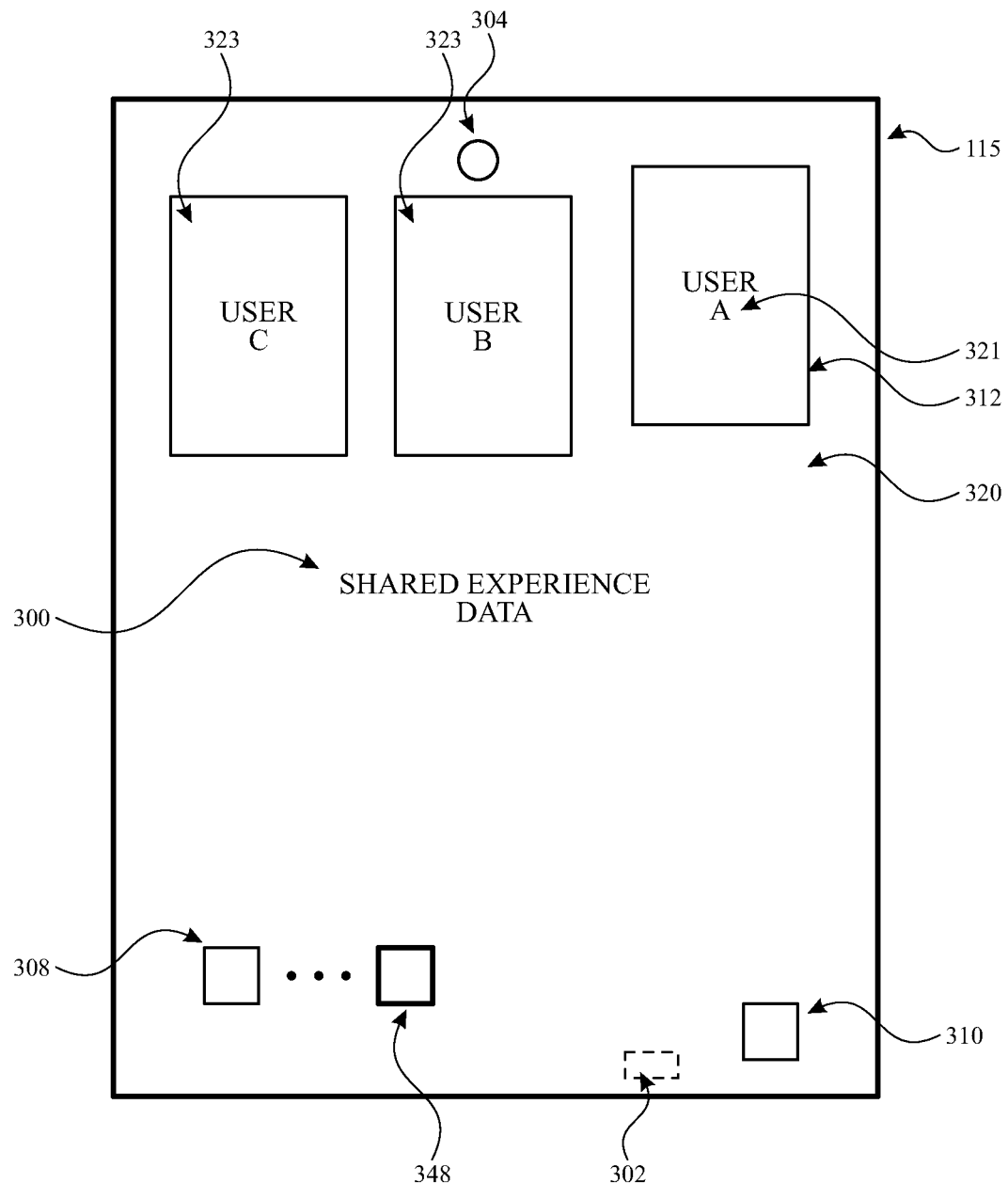
FIG. 3 illustrates a schematic diagram showing an exemplary electronic device during a conferencing session including a shared experience session in accordance with one or more implementations.

FIG. 3 illustrates an example in which the electronic device 115 is a participant device in a group communications session that includes a shared experience session. In one or more implementations, the electronic device 115 may be displaying a user interface of a conferencing module, such as conferencing module 200 running at the electronic device 115. In the example of FIG. 3, the group communications session is represented as a video conferencing session using a video conferencing module running at the device, for illustrative purposes.

As shown in FIG. 3, during a group communications session, the conferencing module 200 can provide, for display, shared experience data 300, one or more incoming video streams 323 received from other participant devices (e.g., a participant device of a User B and a participant device of a User C), and a local display of an outgoing video stream 321 obtained using the camera 304 of the electronic device (e.g., a video stream of a User A of the electronic device 115). A microphone 302 at the electronic device 115 may capture audio input to the electronic device 115 for encryption and transmission as user communications data (e.g., with the outgoing video stream 321 captured by camera 304) to the other participant devices. The shared experience data 300 may be, for example, video content being provided by an application 202 at the electronic device 115, a playlist of content (e.g., songs) being provided by an application 202 at the electronic device 115, a shared white board, or other shared content that is concurrently displayed at one or more of the other participant devices (e.g., participant devices of the User B and the User C, such as electronic device 117 and electronic device 119 of FIG. 1). In one or more implementations, the local copy of the outgoing video stream 321 may be locally displayed in a secondary video stream view 312, such as a picture-in-picture video stream view to allow the local user of the electronic device 115 to view their own outgoing video.

In the example of FIG. 3, shared experience data 300 covers substantially the entire display 320 of electronic device 115 with a portion being covered by the secondary video stream view 312, and additional video stream views for an incoming video stream 323 for each of users B and C. However, this is merely illustrative and other arrangements of shared experience data 300, incoming video streams 323, and secondary video stream view 312 can be provided (e.g., in equally sized or different sized side-by-side or top-bottom or other portions of the display), and/or more or fewer participants (users) can participate in the group communications session.

In one or more implementations, one or more participant devices in the group communications session may not provide video streams to the electronic device 115. In these implementations, an indicator (e.g., a border, a name, or other indicator) of the participant may be provided that does not include any video content, and may visually indicate when audio content from that participant device is being output by the electronic device 115 during the group communications session (e.g., by increasing in size, changing color, or otherwise visually changing to indicate that the corresponding user is providing audio input, such as by speaking into their own device). In the example of FIG. 3, two other participant devices and one application are participating in the group communications session with the electronic device 115. However, this is merely illustrative, and one, two, three, four, or more than four (e.g., five, ten, twenty, etc.) other participant devices and/or one, two, three, four, or more than four applications may participate in the group communications session at a given time.

As shown in FIG. 3, the conferencing module 200 may also provide an add option 348 that can be selected for adding a shared experience session to the group communications session. As shown in FIG. 3, the conferencing module 200 may also provide input options such as camera-select option 310 (e.g., for switching to a rear-facing camera or other camera to provide the outgoing video stream 321) and an add option 308, which can be selected for inviting one or more new users to the group communications session. When a user such as user A selects the add option 308, an option may be provided to allow contact information (e.g., a telephone number or an email address) of a desired invitee to be provided to the conferencing module.

Figure 4:
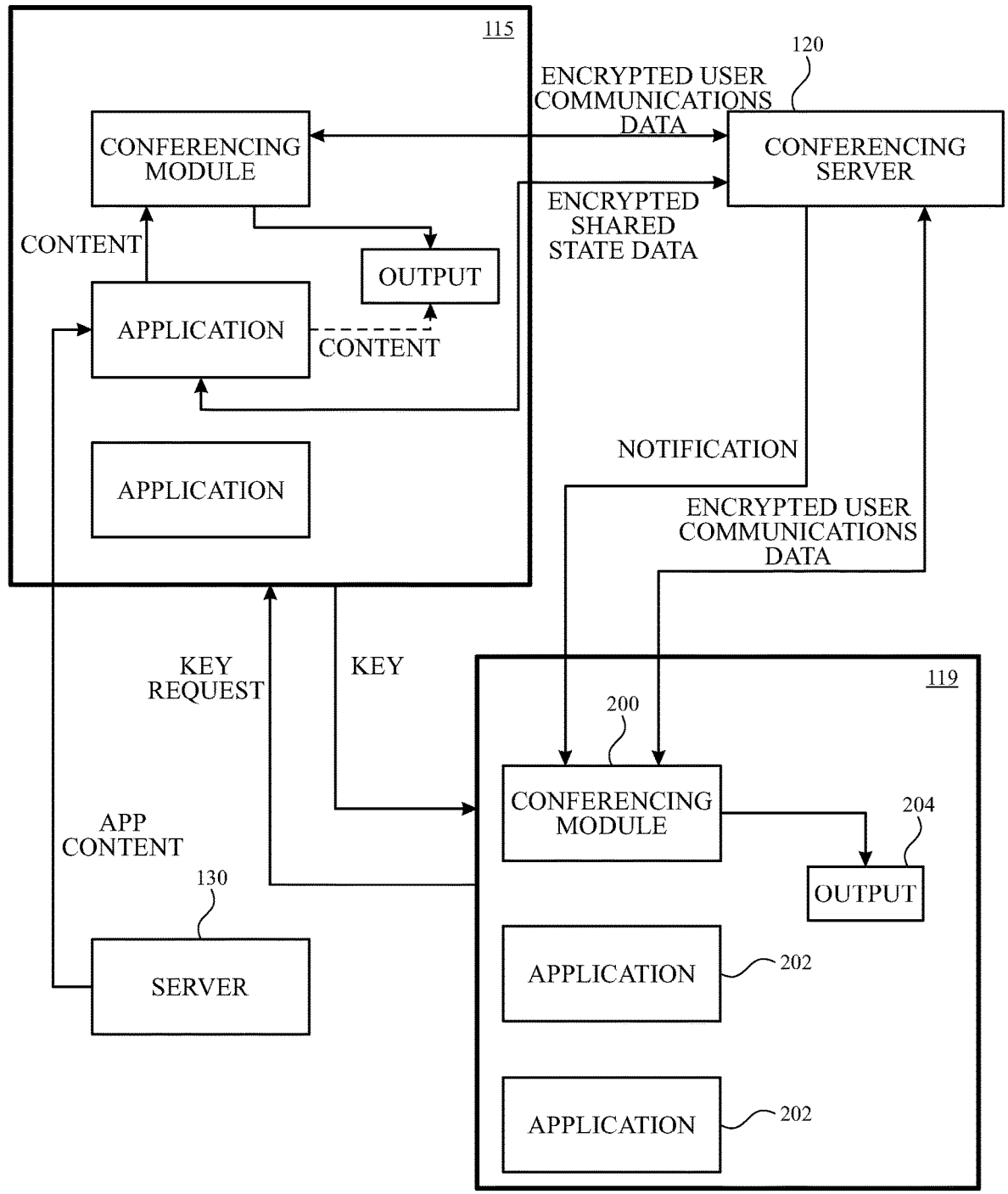
FIGS. 4 and 5 illustrate schematic views of an electronic device joining an ongoing shared experience session during a conferencing session in accordance with one or more implementations.
Figure 5:
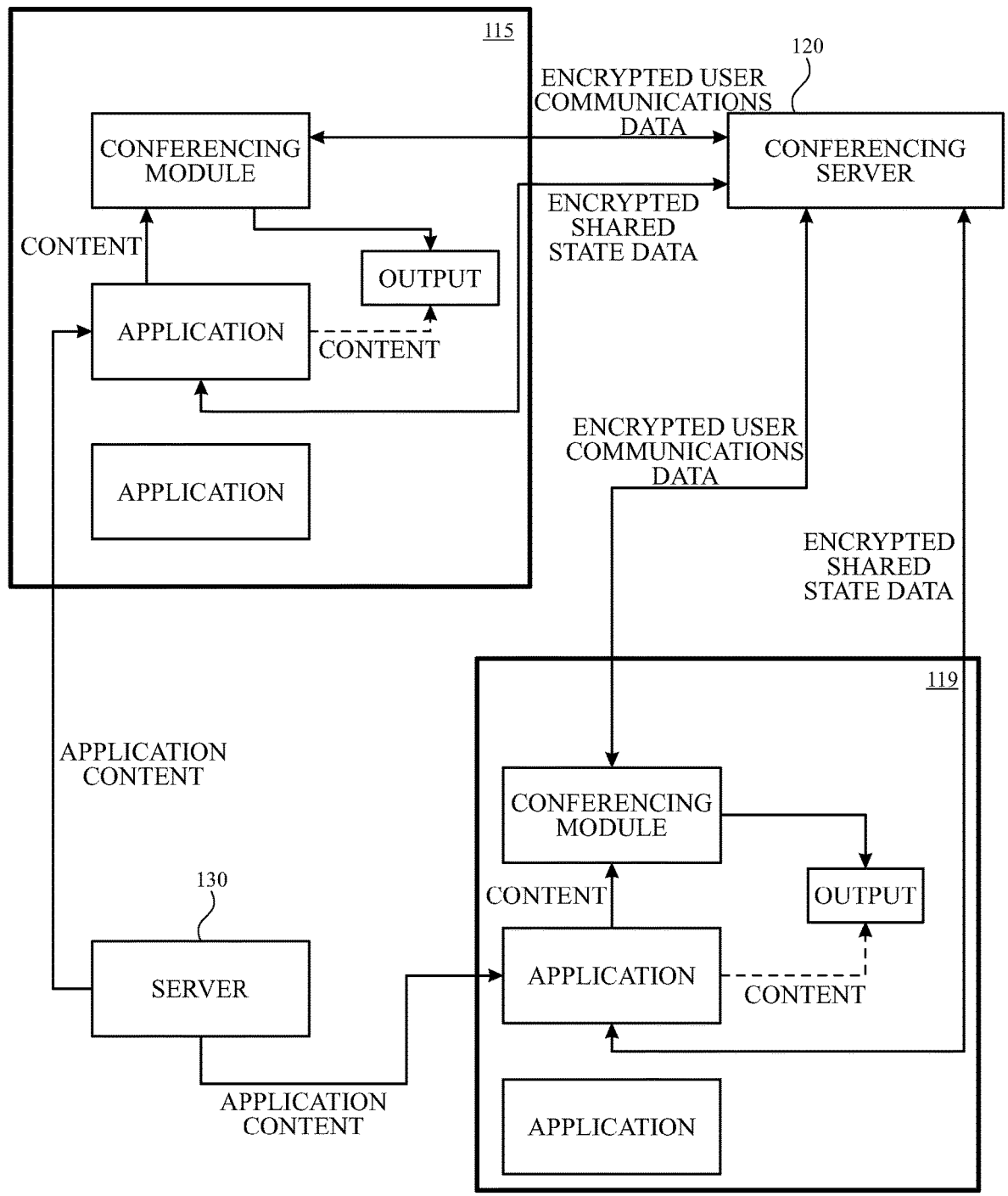

FIGS. 4 and 5 illustrate a scenario in which a new participant device (electronic device 119) joins a group communications session having a shared experience session.

In the example of FIG. 4, the electronic device 117 of FIG. 2 is not shown, but may still be a participant device in the group communications session and the shared experience session as described in connection with FIG. 2. As shown in FIG. 4, the electronic device 119 may be sending and receiving encrypted user communications data via the conferencing server 120 with the electronic device 115 (e.g., and/or other participant devices such as the electronic device 117) after having joined the group communication session (e.g., and obtaining a first encryption key for encrypting/decrypting the user communications data).

As shown in FIG. 4 the electronic device 119 may receive a notification (e.g., from the conferencing server 120) to subscribe to the shared state data for a shared experience session that is ongoing within the group communications session (e.g., with the electronic device 117 and/or other participant devices). Responsive to the notification, the electronic device 119 may obtain a second encryption key for the shared state data, such as by providing a key request to another participant device (e.g., the electronic device 115), receiving a public or root key for the initiator of the shared experience session, and deriving the second encryption key for the shared experience session from the received public or root key and a topic for the shared experience session. The topic may be received as part of the notification from the conferencing server 120 or along with the public or root key from the electronic device 115 or another participant device.

As shown in FIG. 5, after obtaining the second encryption key and subscribing to the shared state data, the electronic device 119 may participate in the shared experience session. As shown, participating in the share experience session may include receiving and decrypting shared state data from the conferencing server 120 (e.g., via a pub-sub module of the conferencing server 120) and optionally providing the shared state data to an application that obtains and outputs content (e.g., media content) provided by a server (e.g., 130. In one or more implementations, the shared state data includes state information indicating a state (e.g., playing, paused, stopped, scanning, a time stamp of the playback, a language, a captioning state, and/or other state information) of a streaming of media streaming data at the electronic device 115 by the application (e.g., 202).

Figure 6:
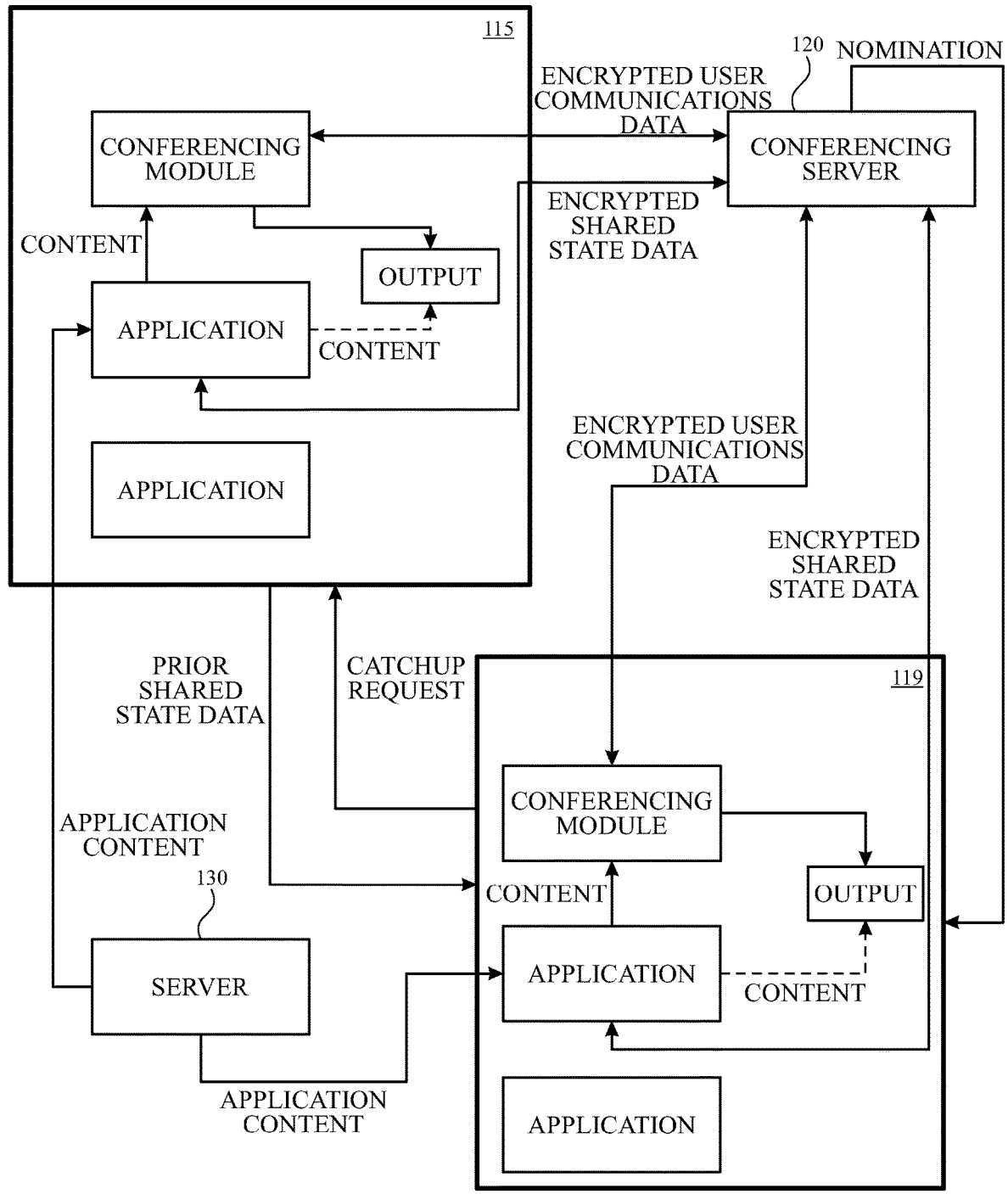
FIG. 6 illustrates a schematic view of a new participant device in an ongoing shared experience session during a conferencing session obtaining catchup information for the shared experience session in accordance with one or more implementations.

As discussed herein, when a new participant device joins an ongoing shared experience session within a group communications session, it may be desirable to provide the new participant device with catchup information (e.g., prior shared state data) for the shared experience session. FIG. 6 illustrates an example in which the conferencing server 120 nominates one of the participant devices (e.g., the electronic device 115) to provide catchup messages to the new participant device (e.g., to synchronize the states of the participant devices up to a watermark or timestamp to achieve the shared state for the shared experience session). In the example of FIG. 6, the conferencing server 120 provides the nomination of the electronic device 115 to the electronic device 119. In some implementations, the conferencing server provides the nomination by using a respective pub-sub module for the shared experience session. In various implementations, the conferencing server 120 may nominate the electronic device 115 randomly from among the participant devices in the group communications session, or based on computing and/or network capabilities of the electronic device 115 and one or more other participant devices (e.g., the server may determine that the electronic device 115 may have a faster or more reliable connection than the electronic device 117).

The electronic device 119 may then provide a catchup request to the electronic device 115 that was nominated by the conferencing server 120, and receive, responsive to the request, the prior shared state data for the shared experience session. In one or more other implementations, the nomination of the electronic device 115 to provide the prior shared state data may be provided directly to the electronic device 115 (e.g., without passing through the conferencing server 120). In one or more implementations the catchup request and/or the prior shared state data may be encrypted using a pre-shared key before being communicated between the electronic device 119 and the electronic device 115.

In the example of FIG. 6, the electronic device 119 may be a device of a participant that joins a group communications session late, and tries to subscribe (e.g., via a pub-sub module of the conferencing server 120) to an ongoing shared experience session within the group communications session. In this scenario, the conferencing server 120 (or any suitable component of the conferencing server, such as a related pub-sub module) indicates to the electronic device 119 that the electronic device 119 is behind and can catch up by communicating with the electronic device 115. The indication from the server may trigger the electronic device 119 to establish a unicast connection to the electronic device 115 using a pre-shared key shared and then to receive any catchup messages from the electronic device 115 over the unicast connection.

As illustrated in FIG. 6, in one or more implementations, one or more servers (e.g., one or more conferencing servers 120, pub-sub modules included in or associated with a conferencing server, etc.) that relay encrypted user communications data and/or encrypted shared state data between first and second participant devices in a group communications session that includes a shared experience session may nominate one of the first or second participant devices to provide catchup information for the shared experience session to a third participant device that joins the shared experience session while the shared experience session is in progress.

Figure 7:
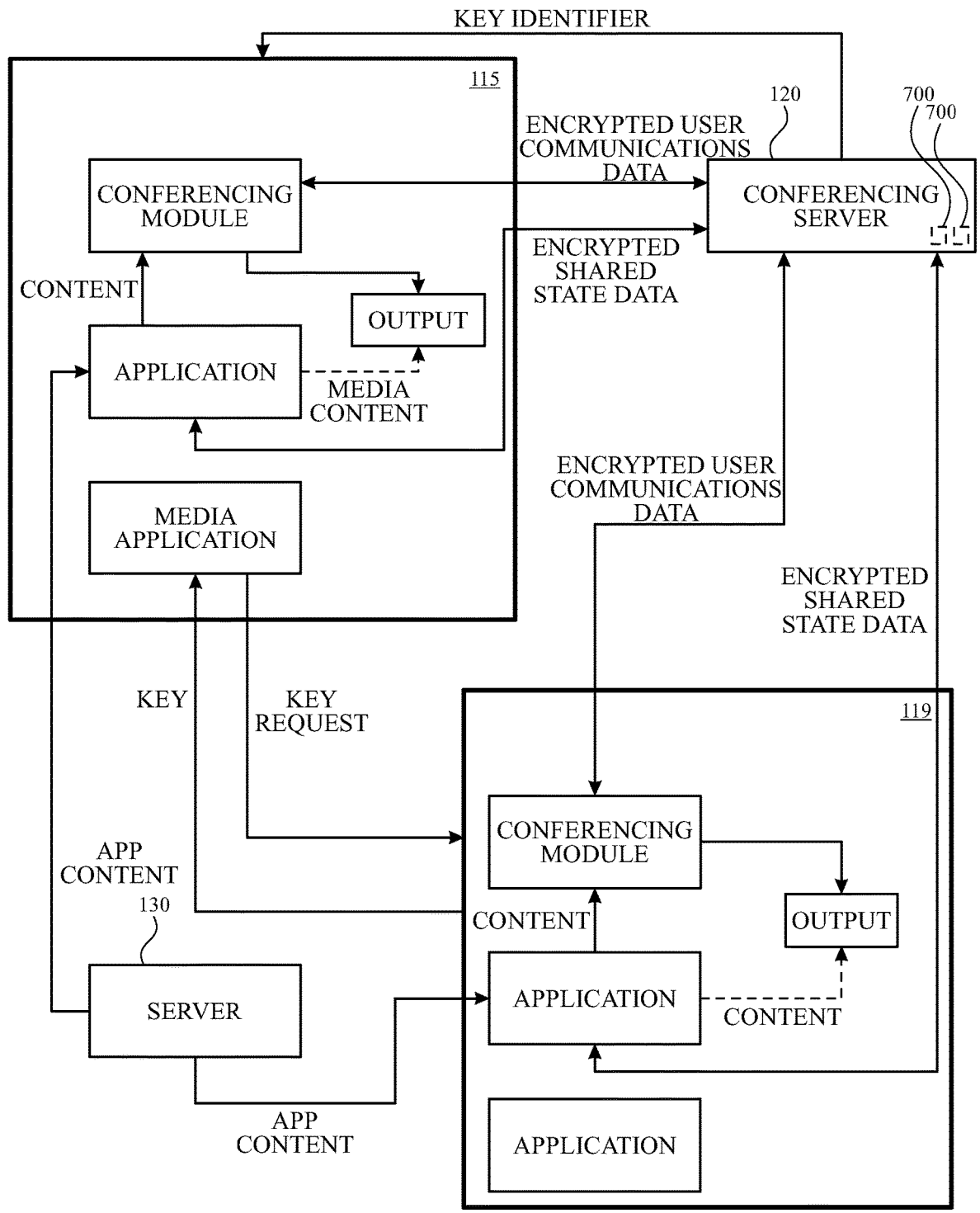
FIG. 7 illustrates a schematic view of a participant device in a shared experience session during a conferencing session recovering a key for the shared experience session in accordance with one or more implementations.

For a variety of reasons, a participant device in a group communications session that includes a shared experience session may, at a given time, have an outdated, expired, or otherwise corrupted or unusable key for the group communications session or the shared experience session. FIG. 7 illustrates an example in which the conferencing server 120 facilitates a key recovery for the electronic device 115.

In the example of FIG. 7, the conferencing server 120 may detect the attempted use of an invalid key by the electronic device 115. For example, the electronic device 115 may provide a key identifier to the conferencing server 120 and the conferencing server 120 may determine that the key identifier is not a current key identifier. As examples, the electronic device 115 may provide the key identifier to the conferencing server 120 periodically, or when the electronic device 115 attempts to decrypt shared state data and is unable to decrypt the shared state data. The conferencing server 120 may notify the electronic device 115 that the key is invalid and provide an indication of which key to obtain. For example, the conferencing server 120 may store one or more key identifiers 700 that each identify a key corresponding to the encrypted shared state data. The key identifiers 700 may include identifiers of one or more prior keys, and an identifier for a current key corresponding to the encrypted shared state data. It is appreciated that the conferencing server 120 does not have access to or store the keys themselves, only identifiers of the keys. In this example, the conferencing server determines that the electronic device 115 does not have the current key corresponding to the encrypted shared state data and provides the key identifier for the current key corresponding to the encrypted shared state data to the electronic device 115. In one or more implementations, each time a participant device generates a new key for a group communications session or a shared experience session, the participant device may provide a key identifier 700 for that key to the conferencing server 120.

As shown in FIG. 7, the electronic device 115 may then provide a key request to another participant device (e.g., the electronic device 119 or the electronic device 117), and receive the key corresponding to the key identifier received from the server, from the other participant device (e.g., encrypted using a previously-exchanged pre-key). For example, the electronic device 117 may receive the key request from the electronic device 115, and send the recovered key to the requesting electronic device 115 encrypted using a previously-exchanged pre-key. In one or more implementations, the key provided from the electronic device 117 to the electronic device 115 may be the current key for the shared state date or may be a key that is used to derive the current key for the shared state data (e.g., using a topic for the share state data) at the electronic device 115.

In the example of FIG. 7, the key request is provided from the electronic device 115 to the electronic device 119. In one or more implementations, key requests may be provided to more than one other participant device (e.g., all other participant devices) in the group communications session. In one or more implementations, when key rolling occurs, the conferencing server 120 assists in making sure that there is no loss of messages (e.g., shared state data messages) between the participant devices (e.g., by notifying participant devices of updated keys and/or by storing an identifier of a latest message and nominating a catchup device for devices that are behind). In one or more implementations, application data to be exchanged between participant devices in a group communication session is sent to the conferencing server 120 (e.g., a relay server and/or a pub-sub module), to publish the application data to subscribed participant devices. In one or more implementations, participant devices subscribe to the messages for a topic at the server (e.g., by interacting with a pub-sub module of the conferencing server 120), so that messages are be relayed to the subscribed participant devices for that topic. In one or more implementations, after receiving an indication from the conferencing server 120 to obtain catchup information previously exchanged as part of a shared experience session, the new participant device establishes a secure peer-to-peer session with another participant device that is indicated in the indication for obtaining the catchup information.

Figure 8:
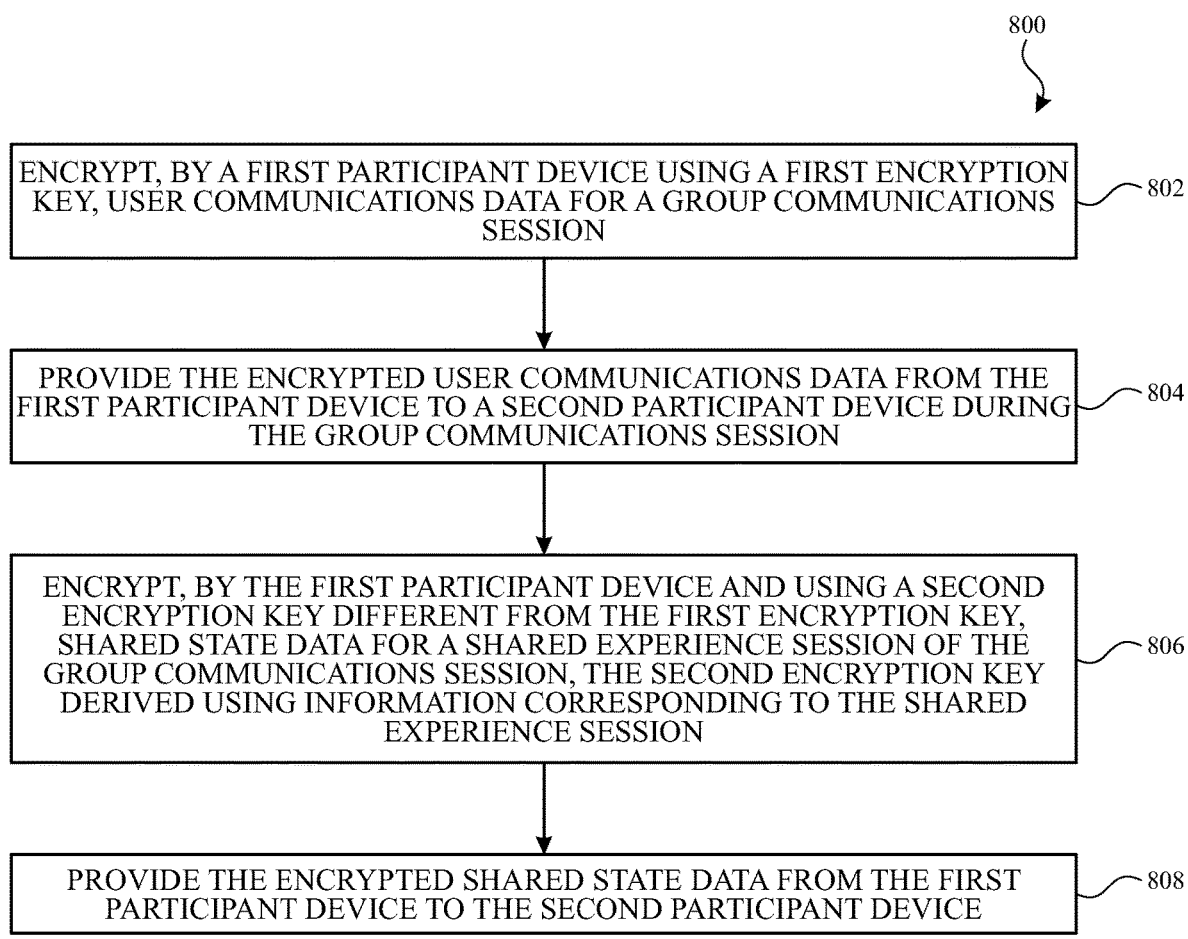
FIG. 8 illustrates a flow diagram of an example process for providing encrypted shared state data for a shared experience session within a conferencing session in accordance with one or more implementations.

FIG. 8 illustrates a flow diagram of an example process 800 for providing encrypted shared state data for a shared experience session in a conferencing session, in accordance with one or more implementations. For explanatory purposes, the process 800 is primarily described herein with reference to the components of FIG. 1 (particularly with reference to electronic device 115), which may be executed by one or more processors of the electronic device 115 of FIG. 1. However, the process 800 is not limited to the electronic device 115, and one or more blocks (or operations) of the process 800 may be performed by one or more other components of other suitable devices, such as one or more of the electronic device 110, the electronic device 117, the electronic device 119, and/or one or more servers such as the conferencing server 120 and/or the server 130. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

In the example process 800, at block 802 a first participant device (e.g., electronic device 115) may encrypt, using a first encryption key, user communications data for a group communications session. For example, the user communications data may include audio input and/or video input to the first participant device (e.g., by a user of the first participant device).

At block 804, the first participant device may provide the encrypted user communications data to a second participant device (e.g., electronic device 117) during the group communications session. Providing the encrypted user communications data to the second participant device may include providing the encrypted user communications data to a conferencing server for relay to the second participant device.

At block 806, the first participant device may encrypt, using a second encryption key different from the first encryption key, shared state data for a shared experience session of the group communications session. In some variations, the first participant device accesses the shared state data from an application running on the first participant device. In some implementations, the application generates the shared state data. In other implementations, the application accesses the shared state data.

For example, the second encryption key may be derived at the first participant device. The second encryption key may be derived using information corresponding to the shared experience session. For example, the information corresponding to the shared experience session may include a topic corresponding to the shared experience session. The second encryption key may be derived from the topic and at least one of a public key or the first encryption key. In one or more implementations, the first participant device may initiate the shared experience session from within the group communications session.

At block 808, the first participant device may provide the encrypted shared state data to the second participant device. Providing the encrypted shared state data to the second participant device may include publishing the encrypted shared data to a conferencing server (e.g., 120) for relay to the second participant device when the second participant device subscribes to the shared experience session. In some implementations, the first participant device publishes the encrypted shared data to a pub-sub module (e.g., of the conferencing server 120) that is associated with the shared experience session, and the second participant device subscribes to the shared experience session by interacting with the pub-sub module.

In some variations, the first participant device receives encrypted shared state data provided by second participant device, and decrypts the received encrypted shared state data. In a first implementation, the first participant device decrypts the data by using the second encryption key. In a second implementation, the first participant device decrypts the data by using a third encryption key (different from the first and second encryption keys) that is used to decrypt encrypted data provided by the second participant device.

In some variations, the first participant device provides the decrypted data (e.g., the decrypted state data provided by the second participant device) to the application running on the first participant device In some variations, the application running on the first participant device provides, in accordance with the decrypted shared state data, shared experience data for the shared experience session of the group communications session. For example, the shared experience data may include media streaming data provided locally for the first participant device by the application running at the first participant device, and the shared state data may include state information indicating a state of a streaming of the media streaming data. For example, providing the shared experience data for the shared experience session of the group communications session may include adding the shared experience data to the group communications session locally at the first participant device by the application running on the first participant device. In one or more implementations, the first participant device may initiate the shared experience session by activating the application at the first participant device (e.g., directly or via a conferencing module 200 at the first participant device).

In one or more implementations, the group communications session includes the shared experience session, which has an application-specific topic corresponding to the application, and at least one additional shared experience session having an additional application-specific topic corresponding to an additional application (e.g., another application or another application) running on the first participant device. The second encryption key may be derived from an identifier of the application-specific topic and a public key that is the same for all participant devices in the group communication session. At least a third encryption key may be derived for the at least one additional shared experience session from the public key and an additional identifier of the additional application-specific topic.

In one or more implementations, the first participant device may generate a third encryption key, different from the first encryption key, for encrypting the user communications data after encrypting the user communications data with the first encryption key for a period of time. The first participant device may encrypt the shared state data with the second encryption key during the period of time. The first participant device may also continue to encrypt the shared state data with the second encryption key after the period of time. The first participant device may determine, after an additional period of time following the period of time, that a new participant device (e.g., electronic device 119) has joined the group communications session. The first participant device may, responsive to determining that the new participant device has joined the group communications session, generating a fourth encryption key, different from the first encryption key and the third encryption key, for encrypting the user communications data. The first participant device may also generate, responsive to determining that the new participant device has joined the group communications session, a fifth encryption key, different from the second encryption key, for encrypting the shared state data.

In one or more implementations, the first participant device may receive a key recovery request from the second participant device (e.g., as discussed above in connection with FIG. 7). The first participant device may, responsive to the key recovery request, encrypt the second encryption key using an additional key previously exchanged by the first participant device and the second participant device. The first participant device may also, responsive to the key recovery request, provide the encrypted second encryption key from the first participant device to the second participant device.

In some variations, encrypting the shared state data with the second encryption key, different from the first encryption key used to encrypt the user communications data, can facilitate subsets of the participants in a group communications session participating in various shared experience sessions within the group communications session. In non-limiting examples, (e.g., an in contrast with a video conferencing in which a user shares their computer screen to all of the participants) a selected subset of the participants can be invited to a shared experience session (and receive the key(s) for that shared experience session), and/or invitees to a shared experience session can selectively join or decline to join on the shared experience session while still participating in the group communications session (and/or other shared experience sessions within the group communications session).

Figure 9:
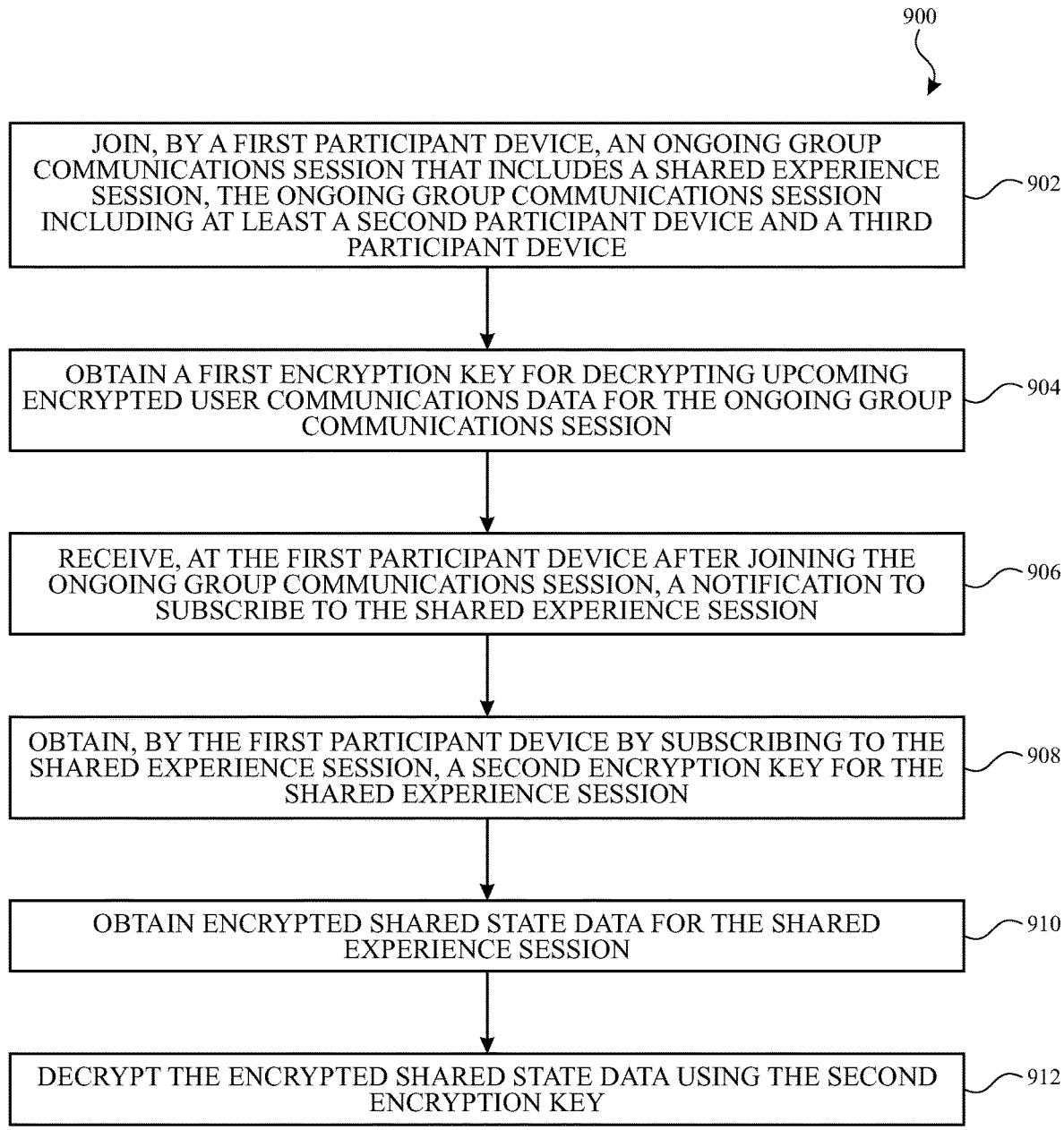
FIG. 9 illustrates a flow diagram of an example process a new participant to join a shared experience session within a conferencing session in accordance with one or more implementations.

FIG. 9 illustrates a flow diagram of an example process 900 for joining an ongoing shared experience session in a conferencing session, in accordance with one or more implementations. For explanatory purposes, the process 900 is primarily described herein with reference to the components of FIG. 1 (particularly with reference to electronic device 119), which may be executed by one or more processors of the electronic device 115 of FIG. 1. However, the process 900 is not limited to the electronic device 119, and one or more blocks (or operations) of the process 900 may be performed by one or more other components of other suitable devices, such as one or more of the electronic device 110, the electronic device 117, the electronic device 115, and/or one or more servers such as the conferencing server 120 and/or the server 130. Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

In the example process 900, at block 902, a first participant device (e.g., electronic device 119) may join an ongoing group communications session that includes a shared experience session, the ongoing group communications session including at least a second participant device (e.g., electronic device 115) and a third participant device (e.g., electronic device 117).

At block 904, the first participant device may obtain a first encryption key for decrypting upcoming encrypted user communications data for the ongoing group communications session. For example, obtaining the first encryption key may include exchanging key information with other participant devices and generating the first encryption key using the key information. In other examples, the first participant device may generate the first encryption key using only location information at the first participant device, and may provide the first encryption key to the other participant devices.

At block 906, the first participant may receive, after joining the ongoing group communications session, a notification to subscribe to the shared experience session (e.g., from a server such as the conferencing server 120, as described above in connection with FIG. 4).

At block 908, the first participant device may obtain, at least in part by subscribing to the shared experience session, a second encryption key for the shared experience session (e.g., from the second participant device or the third participant device, or by deriving the second encryption key at the second participant device using a key provided by the second participant device or the third participant device, as described above in connection with FIGS. 4 and 5).

For example, obtaining the second encryption key may include receiving a topic for the shared experience session at the first participant device. Obtaining the second encryption key may also include deriving the second encryption key at the first participant device using the topic for the shared experience session (e.g., and the key provided by the second participant device or the third participant device). For example, the topic may be provided in the notification to subscribe from the server, or may be provided with the key from the second participant device or the third participant device.

At block 910, the first participant device may obtain encrypted shared state data for the shared experience session. For example, the encrypted shared stated data may be obtained, from a server such as the conferencing server 120 (e.g., as described above in connection with FIG. 5).

At block 912, the first participant device may decrypt the encrypted shared state data using the second encryption key.

In some variations, the participant device provides the decrypted shared state data to an application running on the first participant device. In some variations, the first participant device may provide, in accordance with the shared state data (e.g., in accordance with time information in the shared state data that indicates the state of the shared experience session at the other participant devices), shared experience data for the shared experience session.

In a non-limiting example, providing the shared experience data may include outputting (e.g., with output components 204) media streaming data from the application (e.g., application 202) running at the first participant device. The shared state data may include state information (e.g., time stamp information, playhead information, or the like) indicating a state of a streaming of the media streaming data at the second participant device and/or the third participant device. The output of the media streaming data at the first participant device may be synchronized with the output of the media streaming data at the other participant device(s) using the state information in the shared state data.

In one or more implementation, the first participant device may also receive, from a server associated with the ongoing group communications session (e.g., conferencing server 120), a nomination of the second participant device to provide prior shared state data for the shared experience session to the first participant device (e.g., as described above in connection with FIG. 6). The first participant device may also establish (e.g., based on the nomination) a secure peer-to-peer connection with the second participant device. The first participant device may obtain the prior shared state data for the shared experience session from the second participant device over the secure peer-to-peer connection (e.g., as described above in connection with FIG. 6).

In one or more implementations, the first participant device may also receive, from a server (e.g., conferencing server 120) after obtaining the first encryption key, an identifier of a third encryption key (e.g., as described above in connection with FIG. 7). For example, the identifier may be an identifier of a current key that is later in time than a key being used by the first participant device. The first participant device may obtain the third encryption key from the second participant device or the third participant device using the identifier of the third encryption key.

In one or more implementations, the first participant device may decrypt the encrypted user communications data using the first encryption key, and output (e.g., using output components 204 at the first participant device), user communications (e.g., audio and/or video communications) from a user of the second participant device using user communications data.

Figure 10:
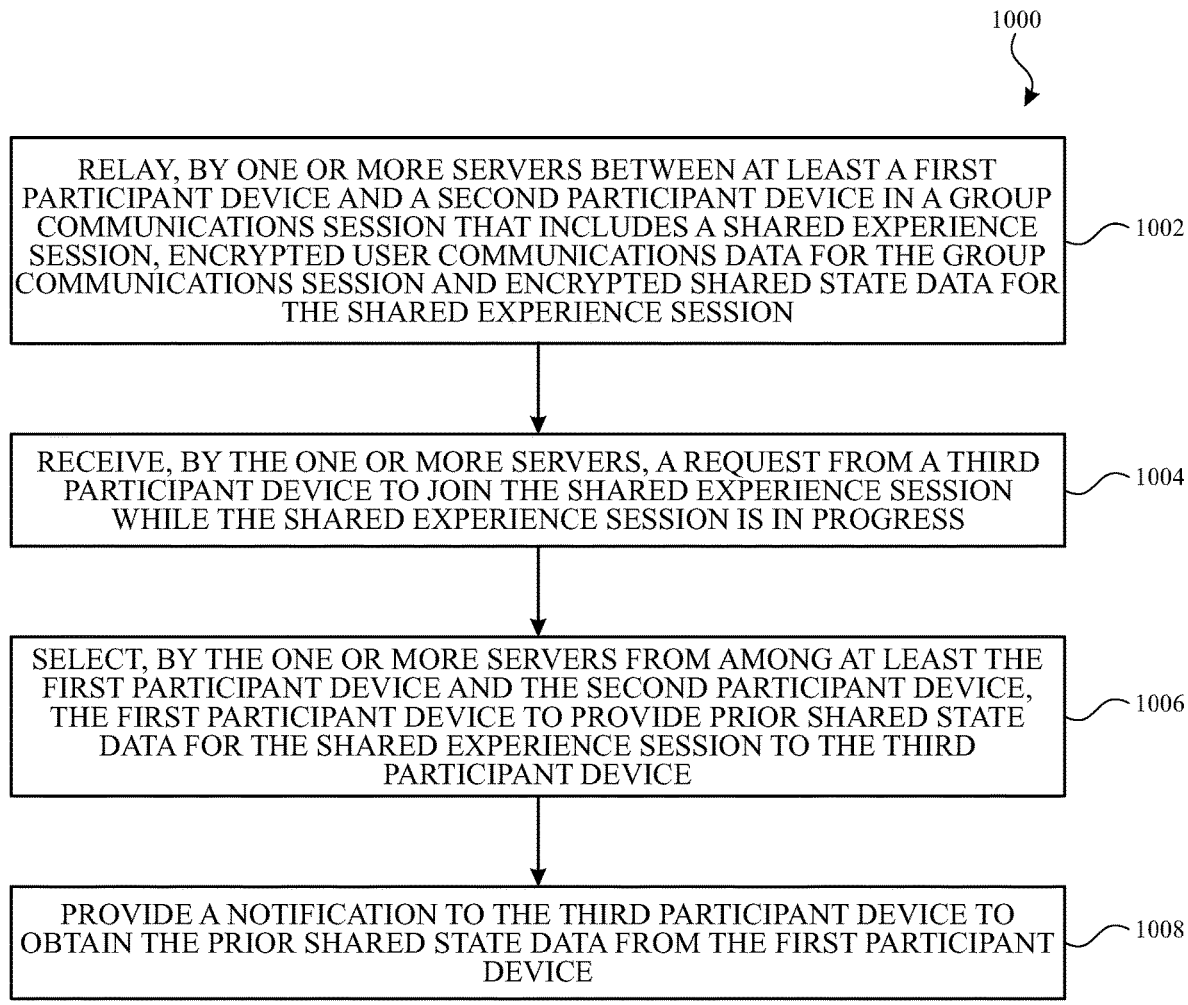
FIG. 10 illustrates a flow diagram of an example process for server operations for providing encrypted shared state data for a shared experience session within a conferencing session in accordance with one or more implementations.

FIG. 10 illustrates a flow diagram of an example process 1000 for server operations for providing encrypted shared state data for a shared experience session in a conferencing session, in accordance with one or more implementations. For explanatory purposes, the process 1000 is primarily described herein with reference to the components of FIG. 1 (particularly with reference to the conferencing server 120), which may be executed by one or more processors of the conferencing server 120 of FIG. 1. In some variations, at least a portion of the process 1000 is performed by using a pub-sub module included in (or associated with) the conferencing server 120. However, the process 1000 is not limited to the conferencing server 120, and one or more blocks (or operations) of the process 1000 may be performed by one or more other components of other suitable devices, such as one or more of the electronic device 110, the electronic device 115, the electronic device 117, the electronic device 119, and/or one or more servers such as the server 130. Further for explanatory purposes, the blocks of the process 1000 are described herein as occurring in serial, or linearly. However, multiple blocks of the process 1000 may occur in parallel. In addition, the blocks of the process 1000 need not be performed in the order shown and/or one or more blocks of the process 1000 need not be performed and/or can be replaced by other operations.

In the example process 1000, at block 1002 one or more servers (e.g., including the conferencing server 120) may relay, between at least a first participant device (e.g., electronic device 115) and a second participant device (e.g., electronic device 117) in a group communications session that includes a shared experience session, encrypted user communications data for the group communications session and encrypted shared state data for the shared experience session (e.g., as described above in connection with FIGS. 2 and 6).

At block 1004, the one or more servers may receive a request from a third participant device (e.g., electronic device 119) to join the shared experience session while the shared experience session is in progress. In one or more implementations, the request may be a request to subscribe to the shared experience session and/or or to message and/or data (e.g., shared state data) corresponding to the shared experience session).

At block 1006, the one or more servers may select, from among at least the first participant device and the second participant device, the first participant device to provide prior shared state data for the shared experience session to the third participant device. For example, selecting the first participant device may include selecting the first participant device randomly from among at least the first participant device and the second participant device. As another example, selecting the first participant device may include selecting the first participant device based on connectivity information for the first participant device and the second participant device (e.g., based on a determination that a network connection for the first participant device is faster and/or more reliable than a network connection for the second participant device).

At block 1008, the first participant device may provide a notification to the third participant device to obtain the prior shared state data from the first participant device (e.g., as described above in connection with FIG. 6). For example, the prior shared state data may include shared state data corresponding to the encrypted shared state data previously exchanged between the first participant device and the second participant device (e.g., and/or any other participant devices that have participated in the shared experience session).

In one or more implementations, the one or more servers may also receive, from the first participant device and the second participant device, additional (e.g., new or newly published) encrypted shared state data, and provide the additional encrypted shared state data to the third participant device following the request.

In one or more implementations, the one or more servers may also store key identifiers (e.g., key identifiers 700 of FIG. 7) identifying one or more keys corresponding to the encrypted shared state data, the key identifiers including an identifier for a current key corresponding to the encrypted shared state data. For example, the one or more servers may store the key identifiers, without storing or otherwise having access to the corresponding keys identified by the key identifiers (which are generated and stored by the participant devices). For example, the encrypted user communications data and the encrypted shared state data that are relayed by the one or more servers may be encrypted (e.g., at the participant devices) using one or more encryption keys (e.g., separate, different encryption keys for the encrypted user communications data and the encrypted shared state data, as described herein) that are inaccessible by the one or more servers.

The one or more servers may determine that at least one of the first participant device, the second participant device, or the third participant device does not have the current key corresponding to the encrypted shared state data (e.g., by comparing a key identifier stored in connection with that device or received from that device as part of a request for the shared state data with the identifier for the current key). The one or more servers may also provide the identifier for the current key corresponding to the encrypted shared state data to the at least one of the first participant device, the second participant device, or the third participant device that does not have the current key corresponding to the encrypted shared state data.

As described herein, aspects of the subject technology may include the collection and transfer of data from an application to other users' computing devices. The present disclosure contemplates that in some instances, this collected data may include personal information data that uniquely identifies or can be used to identify a specific person. Such personal information data can include demographic data, location-based data, online identifiers, telephone numbers, email addresses, voice data, audio data, video data, home addresses, images, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in providing a shared experience session in a conferencing session. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of providing a shared experience session in a conferencing session, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 11:
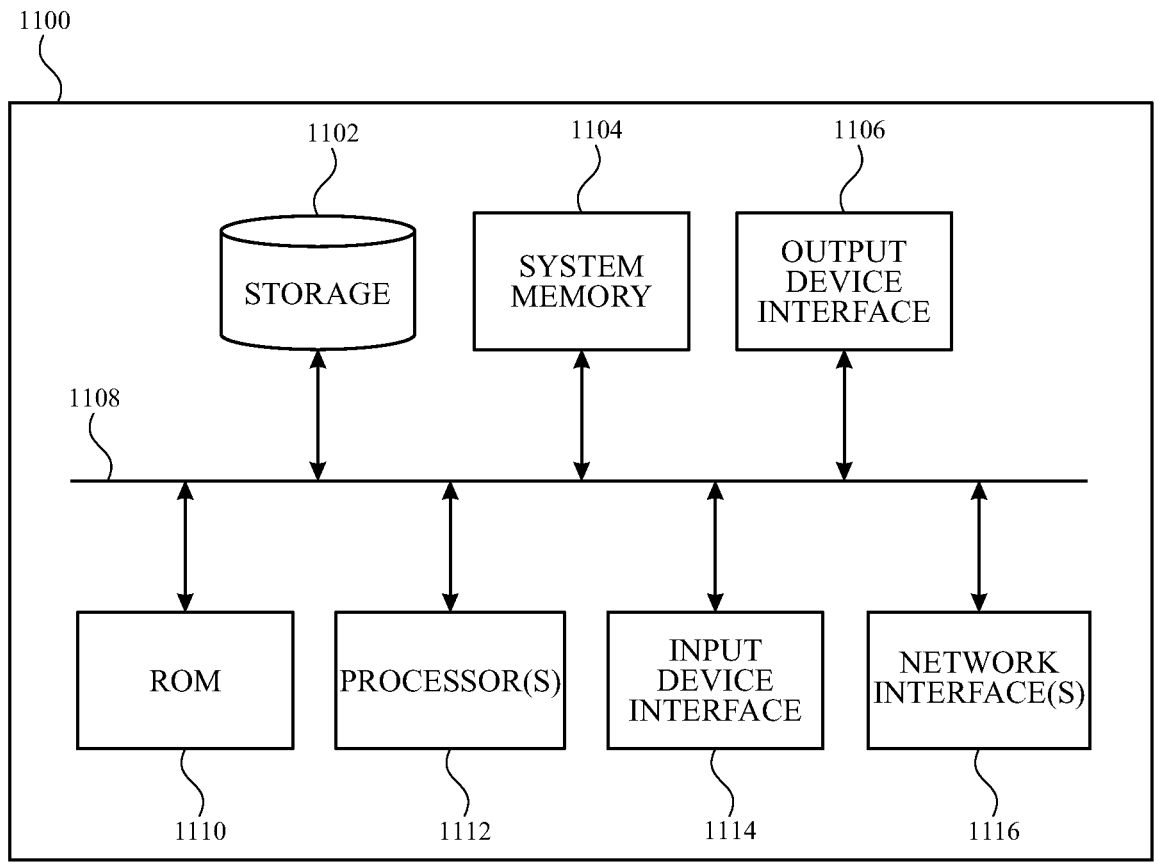
FIG. 11 illustrates an electronic system with which one or more implementations of the subject technology may be implemented.

FIG. 11 illustrates an electronic system 1100 with which one or more implementations of the subject technology may be implemented. The electronic system 1100 can be, and/or can be a part of, the electronic device 110, the electronic device 115, and/or the conferencing server 120 and/or the server 130 shown in FIG. 1. The electronic system 1100 may include various types of computer readable media and interfaces for various other types of computer readable media. The electronic system 1100 includes a bus 1108, one or more processing unit(s) 1112, a system memory 1104 (and/or buffer), a ROM 1110, a permanent storage device 1102, an input device interface 1114, an output device interface 1106, and one or more network interfaces 1116, or subsets and variations thereof.

The bus 1108 collectively represents all system, peripheral, and chipset buses that communicatively connect the numerous internal devices of the electronic system 1100. In one or more implementations, the bus 1108 communicatively connects the one or more processing unit(s) 1112 with the ROM 1110, the system memory 1104, and the permanent storage device 1102. From these various memory units, the one or more processing unit(s) 1112 retrieves instructions to execute and data to process in order to execute the processes of the subject disclosure. The one or more processing unit(s) 1112 can be a single processor or a multi-core processor in different implementations.

The ROM 1110 stores static data and instructions that are needed by the one or more processing unit(s) 1112 and other modules of the electronic system 1100. The permanent storage device 1102, on the other hand, may be a read-and-write memory device. The permanent storage device 1102 may be a non-volatile memory unit that stores instructions and data even when the electronic system 1100 is off. In one or more implementations, a mass-storage device (such as a magnetic or optical disk and its corresponding disk drive) may be used as the permanent storage device 1102.

In one or more implementations, a removable storage device (such as a floppy disk, flash drive, and its corresponding disk drive) may be used as the permanent storage device 1102. Like the permanent storage device 1102, the system memory 1104 may be a read-and-write memory device. However, unlike the permanent storage device 1102, the system memory 1104 may be a volatile read-and-write memory, such as random access memory. The system memory 1104 may store any of the instructions and data that one or more processing unit(s) 1112 may need at runtime. In one or more implementations, the processes of the subject disclosure are stored in the system memory 1104, the permanent storage device 1102, and/or the ROM 1110. From these various memory units, the one or more processing unit(s) 1112 retrieves instructions to execute and data to process in order to execute the processes of one or more implementations.

The bus 1108 also connects to the input and output device interfaces 1114 and 1106. The input device interface 1114 enables a user to communicate information and select commands to the electronic system 1100. Input devices that may be used with the input device interface 1114 may include, for example, alphanumeric keyboards and pointing devices (also called "cursor control devices"). The output device interface 1106 may enable, for example, the display of images generated by electronic system 1100. Output devices that may be used with the output device interface 1106 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 11, the bus 1108 also couples the electronic system 1100 to one or more networks and/or to one or more network nodes, such as the electronic device 115 shown in FIG. 1, through the one or more network interface(s) 1116. In this manner, the electronic system 1100 can be a part of a network of computers (such as a LAN, a wide area network ("WAN"), or an Intranet, or a network of networks, such as the Internet. Any or all components of the electronic system 1100 can be used in conjunction with the subject disclosure.

In accordance with various aspects of the subject disclosure, a method is provided that includes encrypting, by a first participant device using a first encryption key, user communications data for a group communications session; providing the encrypted user communications data from the first participant device to a second participant device during the group communications session; accessing, from an application running on the first participant device, shared state data for a shared experience session of the group communications session; encrypting, by the first participant device and using a second encryption key different from the first encryption key, the accessed shared state data, the second encryption key derived using information corresponding to the shared experience session; providing the encrypted shared state data from the first participant device to the second participant device. In some variations, the method optionally includes: providing, by an application running on the first participant device and in accordance with the shared state data, shared experience data for the shared experience session of the group communications session.

In accordance with various aspects of the subject disclosure, a method is provided that includes joining, by a first participant device, an ongoing group communications session that includes a shared experience session, the ongoing group communications session including at least a second participant device and a third participant device; obtaining a first encryption key for decrypting upcoming encrypted user communications data for the ongoing group communications session; receiving, at the first participant device after joining the ongoing group communications session, a notification to subscribe to the shared experience session; obtaining, by the first participant device by subscribing to the shared experience session, a second encryption key for the shared experience session; obtaining encrypted shared state data for the shared experience session; decrypting the encrypted shared state data using the second encryption key; and providing the shared state data to an application running on the first participant device. In some variations, the method optionally includes: providing, by the first participant device in accordance with the shared state data, shared experience data for the shared experience session.

In accordance with various aspects of the subject disclosure, a method is provided that includes: relaying, by one or more servers between at least a first participant device and a second participant device in a group communications session that includes a shared experience session, encrypted user communications data for the group communications session and encrypted shared state data for the shared experience session; receiving, by the one or more servers, a request from a third participant device to join the shared experience session while the shared experience session is in progress; selecting, by the one or more servers from among at least the first participant device and the second participant device, the first participant device to provide prior shared state data for the shared experience session to the third participant device; and providing a notification to the third participant device to obtain the prior shared state data from the first participant device.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   encrypting, by a first participant device using a first encryption key, user communications data for a group communications session;
   providing the encrypted user communications data from the first participant device to a second participant device during the group communications session;
   accessing, from an application running on the first participant device, shared state data for a shared experience session of the group communications session;
   encrypting, by the first participant device and using a second encryption key different from the first encryption key, the accessed shared state data, wherein the second encryption key is derived using information corresponding to the shared experience session; and
   providing the encrypted shared state data from the first participant device to the second participant device.

2. The method of claim 1, wherein the shared state data includes state information indicating a state of a streaming of media streaming data.

3. The method of claim 1, wherein the information corresponding to the shared experience session comprises a topic corresponding to the shared experience session, and wherein the second encryption key is derived from the topic and at least one of a public key or the first encryption key.

4. The method of claim 1, further comprising initiating, by the first participant device, the shared experience session from within the group communications session.

5. The method of claim 1, wherein the group communications session includes the shared experience session, which has an application-specific topic corresponding to the application, and at least one additional shared experience session having an additional application-specific topic corresponding to an additional application running on the first participant device.

6. The method of claim 5, wherein the second encryption key is derived from an identifier of the application-specific topic and a public key that is the same for all participant devices in the group communication session.

7. The method of claim 6, wherein at least a third encryption key is derived for the at least one additional shared experience session from the public key and an additional identifier of the additional application-specific topic.

8. The method of claim 1, further comprising:
generating a third encryption key, different from the first encryption key, for encrypting the user communications data after encrypting the user communications data with the first encryption key for a period of time;
encrypting the shared state data with the second encryption key during the period of time; continuing to encrypt the shared state data with the second encryption key after the period of time;
determining, after an additional period of time following the period of time, that a new participant device has joined the group communications session; and
responsive to determining that the new participant device has joined the group communications session:
generating a fourth encryption key, different from the first encryption key and the third encryption key, for encrypting the user communications data; and
generating a fifth encryption key, different from the second encryption key, for encrypting the shared state data.

9. The method of claim 1, further comprising:
receiving, by the first participant device, a key recovery request from the second participant device; and
responsive to the key recovery request:
encrypting the second encryption key using an additional key previously exchanged by the first participant device and the second participant device; and
providing the encrypted second encryption key from the first participant device to the second participant device.

10. The method of claim 1, further comprising deriving the second encryption key at the first participant device.

11. The method of claim 1, further comprising, by the first participant device:
receiving encrypted shared state data provided by the second participant device;
decrypting, by the first participant device and using the second encryption key, the received encrypted shared state data to generate decrypted data; and
providing the decrypted data to the application running on the first participant device.

12. A device, comprising:
a memory; and
one or more processors configured to:
encrypt, using a first encryption key, user communications data for a group communications session including, wherein the device is a first participant device in the group communications session;
provide the encrypted user communications data to a second participant device during the group communications session;
access, from an application running on the first participant device, shared state data for a shared experience session of the group communications session;
encrypt, using a second encryption key different from the first encryption key, the accessed shared state data, wherein the second encryption key is derived using information corresponding to the shared experience session; and
provide the encrypted shared state data from the first participant device to the second participant device.

13. The device of claim 12, wherein the shared state data includes state information indicating a state of a streaming of media streaming data.

14. The device of claim 12, wherein the information corresponding to the shared experience session comprises a topic corresponding to the shared experience session, and wherein the second encryption key is derived from the topic and at least one of a public key or the first encryption key.

15. The device of claim 12, wherein the one or more processors are further configured to initiate the shared experience session from within the group communications session.

16. The device of claim 12, wherein the group communications session includes the shared experience session, which has an application-specific topic corresponding to the application, and at least one additional shared experience session having an additional application-specific topic corresponding to an additional application running on the first participant device.

17. The device of claim 16, wherein the second encryption key is derived from an identifier of the application-specific topic and a public key that is the same for all participant devices in the group communication session.

18. The device of claim 17, wherein at least a third encryption key is derived for the at least one additional shared experience session from the public key and an additional identifier of the additional application-specific topic.

19. The device of claim 12, wherein the one or more processors are further configured to:
generate a third encryption key, different from the first encryption key, for encrypting the user communications data after encrypting the user communications data with the first encryption key for a period of time;
encrypt the shared state data with the second encryption key during the period of time;
continue to encrypt the shared state data with the second encryption key after the period of time;
determine, after an additional period of time following the period of time, that a new participant device has joined the group communications session; and
responsive to determining that the new participant device has joined the group communications session:
generate a fourth encryption key, different from the first encryption key and the third encryption key, for encrypting the user communications data; and
generate a fifth encryption key, different from the second encryption key, for encrypting the shared state data.

20. A non-transitory computer-readable medium storing instructions which, when executed by one or more processors, cause the one or more processors to perform operations comprising:
  encrypting, by a first participant device using a first encryption key, user communications data for a group communications session;
  providing the encrypted user communications data from the first participant device to a second participant device during the group communications session;
  accessing, from an application running on the first participant device, shared state data for a shared experience session of the group communications session;
  encrypting, by the first participant device and using a second encryption key different from the first encryption key, the accessed shared state data, wherein the second encryption key is derived using information corresponding to the shared experience session; and
  providing the encrypted shared state data from the first participant device to the second participant device.

* * * * *